United States Patent
Xia et al.

(10) Patent No.: US 7,925,483 B2
(45) Date of Patent: *Apr. 12, 2011

(54) METHODS FOR VISUALIZING DISTANCES BETWEEN WELLBORE AND FORMATION BOUNDARIES

(75) Inventors: Peiwen Xia, Sugar Land, TX (US); Jan W. Smits, Sugar Land, TX (US); Lawrence Chou, Pearland, TX (US); Qiming Li, Sugar Land, TX (US); Dzevat Omeragic, Sugar Land, TX (US); James F. Bristow, Sugar Land, TX (US); Paul A. Wand, Cambridgeshire (GB); Jean-Michel Denichou, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/610,942

(22) Filed: Nov. 2, 2009

(65) Prior Publication Data

US 2010/0122847 A1      May 20, 2010

Related U.S. Application Data

(63) Continuation of application No. 11/161,809, filed on Aug. 17, 2005, now Pat. No. 7,630,872.

(60) Provisional application No. 60/610,475, filed on Sep. 16, 2004.

(51) Int. Cl.
*G06G 7/48*     (2006.01)
*G01V 1/00*     (2006.01)

(52) U.S. Cl. ............... 703/10; 367/69; 367/72
(58) Field of Classification Search ............ 703/10; 367/69, 72; 702/2, 6, 10, 13
See application file for complete search history.

(56) References Cited

U.S. PATENT DOCUMENTS 4,092,779 A     6/1978     Stokic
(Continued)

OTHER PUBLICATIONS

O. Boe, J. Flynn, E. Reiso, "On Near-Wellbore Modeling and Real-Time Reservoir Management" Jun. 2002 Reservoir Evaluation & Engineering, Society of Petrolium Engineers, pp. 219-228.*

(Continued)

*Primary Examiner* — Dwin M Craig
(74) *Attorney, Agent, or Firm* — Darla Fonseca; Brigitte Echols; Charlotte Rutherford

(57) ABSTRACT

A method for displaying a formation model while drilling a wellbore in the formation includes operating a well logging instrument at a measurement point in the formation along a wellbore while the wellbore is being drilled. Measurement data regarding the formation are obtained from the well logging instrument. An actual orientation of a geological structure is determined from the measurement data. A trajectory of the wellbore is displayed in three dimensions as it is being drilled through the formation. While drilling the wellbore, the geological structure is displayed along the trajectory of the wellbore according to the determined actual orientation of the geological structure. The actual orientation reflects an azimuth angle of planes corresponding to the geological structure. The trajectory of the wellbore is changed in response to displaying the determined actual orientation of the geological structure relative to the trajectory.

24 Claims, 14 Drawing Sheets

U.S. PATENT DOCUMENTS

| | | | |
|---|---|---|---|
| 4,779,201 A | 10/1988 | Iizuka et al. | |
| 6,078,867 A | 6/2000 | Plumb et al. | |
| 6,594,584 B1 | 7/2003 | Omeragic et al. | |
| 7,630,872 B2 * | 12/2009 | Xia et al. | 703/10 |
| 2004/0158997 A1 | 8/2004 | Tang | |
| 2005/0140373 A1 | 6/2005 | Li et al. | |

OTHER PUBLICATIONS

RA Fagin et al., "MWD Resistivity Tool Guides Bit Horizontally in Thin Bed," Oil & Gas Journal, Dec. 9, 1991, pp. 62-65.

"MWD Resistivity Tool Guides Bit Horizontally in Thin Bed," Oil & Gas Journal, Dec. 9, 1991.

* cited by examiner

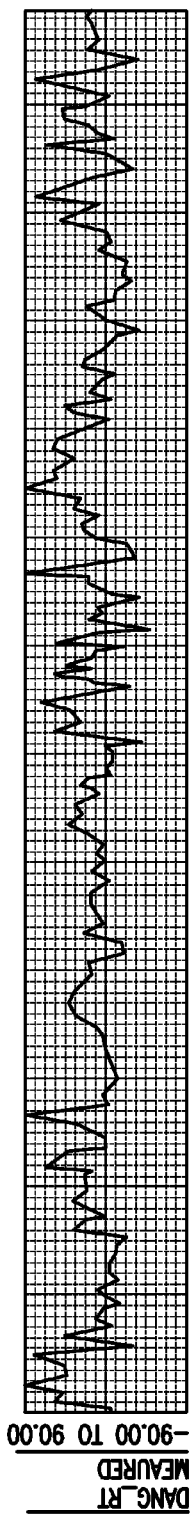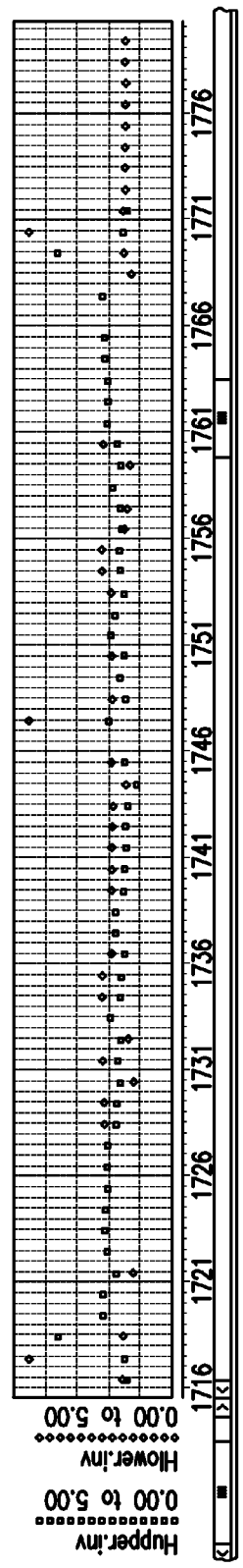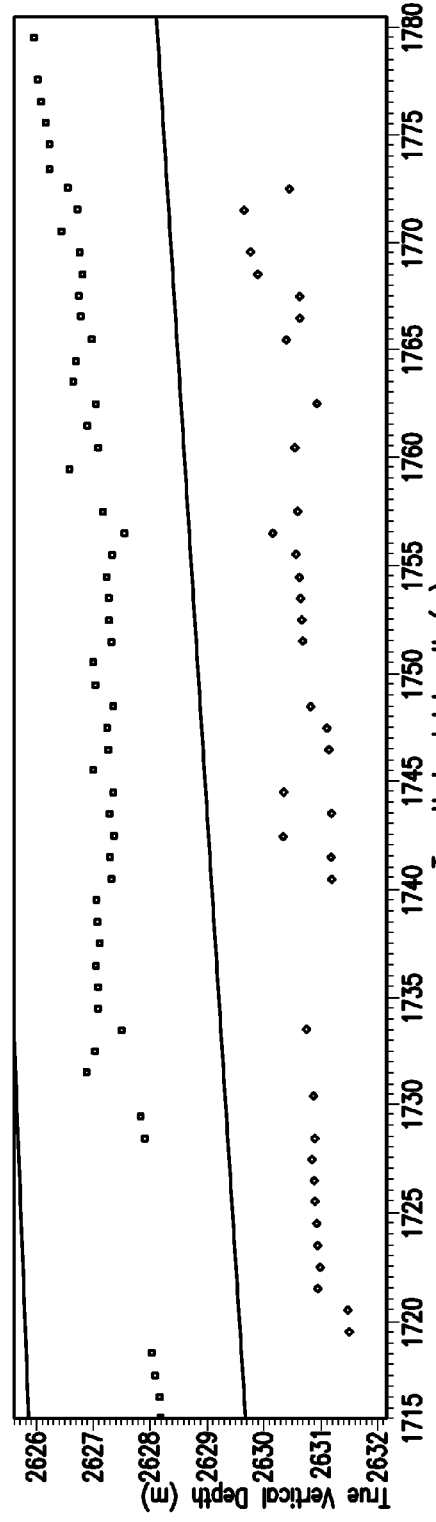
FIG.2A (PRIOR ART)
FIG.2B (PRIOR ART)
FIG.2C (PRIOR ART)

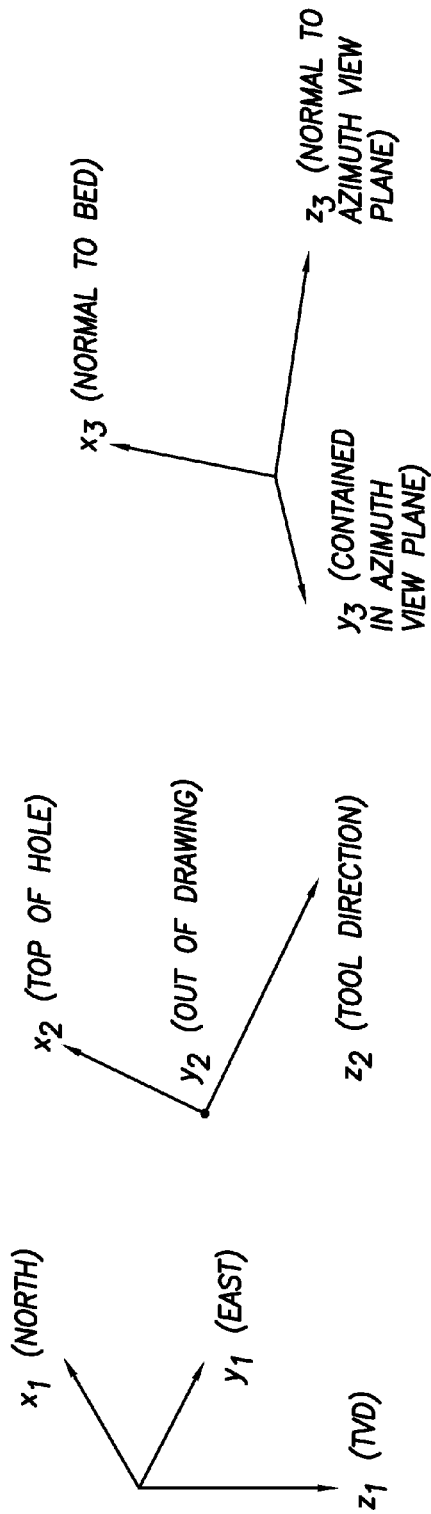
FIG.9C
FIG.9B
FIG.9A
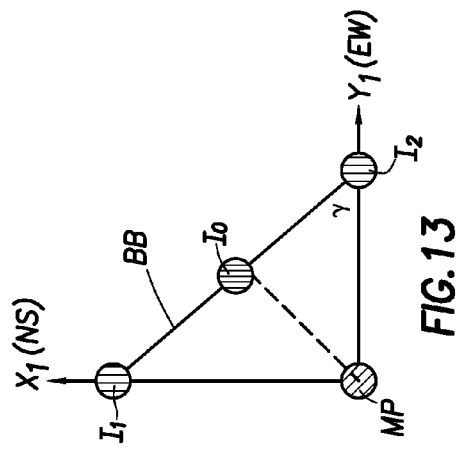
FIG.13

METHODS FOR VISUALIZING DISTANCES BETWEEN WELLBORE AND FORMATION BOUNDARIES

CROSS REFERENCE TO RELATED APPLICATIONS

This is a continuation of U.S. patent application Ser. No. 11/161,809 filed on Aug. 17, 2005 now U.S. Pat. 7,630,872. Priority is claimed from U.S. Provisional Application No. 60/610,475, filed on Sep. 16, 2004.

BACKGROUND OF INVENTION

1. Field of the Invention

The invention relates generally to well drilling and well logging. In particular, the present invention relates to displays based on well logging measurements to facilitate well placement during drilling.

2. Background Art

Wellbores drilled through earth formations to drain fluids (such as petroleum) are frequently drilled along a substantially horizontal trajectory in a petroleum reservoir to increase the drainage area in the reservoir. See, for example, "*MWD resistivity tool guides bit horizontally in thin bed*," Oil and Gas Journal Dec. 9, 1991. Because petroleum reservoirs are frequently located in layered earth formations, the position of such substantially horizontal wellbores with respect to the boundaries of the layers in the earth formations often has a material effect on the productivity of such wellbores. Estimation of distances to layer boundaries, therefore, is important for well landing and drain-hole positioning.

Techniques known in the art for estimation of the wellbore position with respect to layer boundaries include those which are indirectly based on well logging measurements in close-by ("offset") wellbores. These techniques assume that the composition and the geometry of the formation layers proximate to the wellbore of interest are substantially the same as in the offset wellbores.

Another group of prior art techniques is based on the observation of features, referred to as "horns," which appear in measurements made by electromagnetic-type well logging instruments. When this type of instrument approaches a layer boundary between two beds with a (typically large) contrast in electrical resistivity, a significant distortion of the resistivity signal magnitude (a horn) occurs. Qualitative estimates of the distance between the instrument and the layer boundary may be made by observing the magnitude of the horns.

In addition to these techniques that rely on simple distances to the boundaries for well placement, recent techniques use measurements that include three-dimensional information. For example, recent developments in logging while drilling (LWD) tools with tilted antenna indicate that it is feasible to use the improved directional measurements for accurate well placement. U.S. Pat. No. 6,594,584 issued to Omeragic et al. discloses methods using these measurements in real-time to obtain bed boundary distances by inversion calculation.

Geosteering often requires quick decisions. Therefore, it is very important that the relevant information is presented in an intuitive manner. Relevant information needed for accurate well placement may include azimuthal dependence of the directional measurements, inverted distances to bed boundaries, and an improved earth model. During a geosteering job, the geosteering engineer shall be able to assess easily from various displays the distances between the tool and the nearby bed boundaries, and the trend of the well path, i.e., whether the tool gets closer to or farther away from a bed boundary. This kind of visualization capability will allow geosteering engineers to make accurate decisions about adjusting the well path while drilling.

SUMMARY OF THE INVENTION

A method for displaying a formation model while drilling a wellbore in the formation according to one aspect of the invention includes operating a well logging instrument at a measurement point in the formation along a wellbore while the wellbore is being drilled. Measurement data regarding the formation are obtained from the well logging instrument. An actual orientation of a geological structure is determined from the measurement data. A trajectory of the wellbore is displayed in three dimensions as it is being drilled through the formation. While drilling the wellbore, the geological structure is displayed along the trajectory of the wellbore according to the determined actual orientation of the geological structure. The actual orientation reflects an azimuth angle of planes corresponding to the geological structure. The trajectory of the wellbore is changed in response to displaying the determined actual orientation of the geological structure relative to the trajectory.

Other aspects and advantages of the invention will be apparent from the following description and the appended claims.

BRIEF DESCRIPTION OF DRAWINGS

FIGS. 2A-2C show prior art graphs typically used to provide information of the well path.

FIGS. 9A-9C show different coordinate systems used in transforming survey coordinates into coordinates in azimuth-view in accordance with one embodiment of the invention.

FIG. 13 shows a diagram illustrating a transformation to project the boundaries in a plan view in accordance with one embodiment of the invention.

DETAILED DESCRIPTION

Embodiments of the invention relate to methods and systems for visually detecting axial and azimuthal changes in formation property boundaries. Prompt recognition of formation property changes can be critical in geosteering. Methods of the invention allow for prompt recognition of changes in the formation properties—such as when the drill bit is coming near a boundary. Recognizing formation parameter changes can prompt the well operator to take actions to reduce risk associated with drilling a wellbore and to optimize the position of the well within the reservoir.

As noted above, recent developments in tools having tilted or transverse antennas have made it possible to obtain resistivity measurements that include azimuthal information. The increased information contents in the measurements make it possible to precisely control the well placement in 3D space. However, before this rich information can have its maximum impact on real time geosteering operations, there exists a need for methods to present this information to the operators in an intuitive manner such that the information can be easily comprehended to facilitate quick decision making.

Embodiments of the invention provide visual presentations of the multiple parameter values in an intuitive manner. Methods of the invention provide efficiency and simplicity to the process of interpreting data that are available during the drilling and logging phases of wellbore construction. Some embodiments of the invention relate to methods for visualizing distances (which may be inverted in real time from measurement data) to bed boundaries (i.e., locations of formation property changes) in 3-dimensional views such that the measurement data are intuitively comprehensible to a well engineer or operator. Other embodiments of the invention provide methods that use a combination of judiciously selected 2-dimensional displays to convey to the operator the precise location of a drill bit or wellbore in a 3-dimensional sense. For example, in a particular embodiment, four different 2-dimensional views: azimuth view, plan view, inversion canvas, and curtain section display, are used to indicate the location and orientation of a drill bit (or sensor) in the formation in a 3D sense. Methods of the invention may also be used to improve an initial earth model, which may be created, for example, based on offset well measurements and static geological information.

Raw logging data are often analyzed with inversion methods to produce computed data that bear some relationship with physical properties of the formation. Various inversions methods are known in the art. See, for example, U.S. Pat. No. 6,594,584 issued to Omeragic et al. This patent is incorporated by reference in its entirety. Any of these prior art inversion methods may be used with embodiments of the invention.

Figure 1:
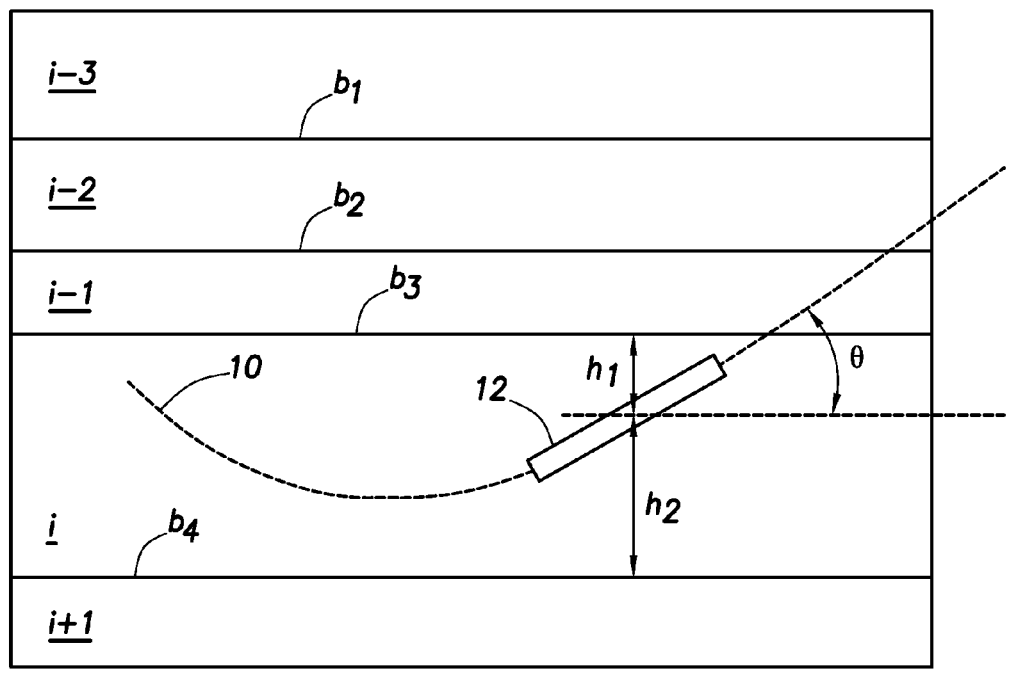
FIG. 1 shows a conventional formation model having multiple layers of beds and including a logging instrument in a wellbore.

Inversion processing uses a formation model. An initial model for the processing may be based on information obtained from a nearby pilot well or other information. FIG. 1 shows an example of an initial model of earth formations surrounding a wellbore. In the initial model, physical properties of the individual layers in the model may include, for example, conductivity (or its inverse, resistivity) of each layer, the thickness of each layer, and a selected number of layers above and below the layer of interest. This model shows the formations as a series of layers or strata, indicated as $i-3$, $i-2$, $i-1$, $i$, and $i+1$. Boundaries between neighboring layers are shown as $b_1$, $b_2$, $b_3$ and $b_4$. The layer of interest is layer i, in which the well logging instrument 12 (e.g., a resistivity tool) is located.

In FIG. 1, the well logging instrument 12 is disposed in a wellbore 10. At the particular position, the well logging instrument 12 is displaced from the upper boundary $b_3$ and the lower boundary $b_4$ by the distances $h_1$ and $h_2$, respectively. These distances, $h_1$ and $h_2$, together with formation properties (e.g., the resistivities of the layer of interest and the upper and lower layers), may be derived from the measurement data by inversion processing. In addition, the apparent dip angle θ may also be derived. Apparent dip is used in many displays, including Azimuth Views to be described later.

In accordance with some embodiments of the invention, an inversion processing may produce the locations of the upper and lower bed boundaries in 3D space relative to tool position, the apparent azimuth angles between the tool and bed boundaries, etc. Given the inverted results at two neighboring measured depths and tool positions in 3D space, the bed boundary positions can be uniquely determined in 3D space. This information will be valuable to the well operator if it can be presented in an intuitive manner to convey the 3D sense.

As noted above, prior art display methods often present the raw measurement data and the interpretation results as depth or time indexed files or well log graphs, rather than in 3D presentations. See, for example, U.S. Patent Application Publication No. 2005/0140373A1 by Li et al. which discloses graphical user interfaces and 2D displays for the inverted bedding models.

FIGS. 2A-2C and FIG. 3 show examples of some prior art graphs that may be used in geosteering. FIGS. 2A-2C show a typical well log graph presented in a conventional 2D strip chart format. The graph includes information related to the locations of bed boundaries (i.e., formation parameter boundaries) relative to the location of the wellbore. FIG. 2A shows measured azimuthal locations of a bed boundary along the length of a wellbore. FIG. 2B shows inverted distances between the measurement tool (or wellbore) and the boundaries—upper and lower boundaries—along the length of the wellbore. FIG. 2C shows an example of a two-dimensional display that shows the inverted boundaries along a well path that is shown relative to its true vertical depth and true horizontal length. In this view, the well path and the associated bed boundary locations are presented in a two-dimensional display, and any three-dimensional information (e.g., twists and turns of the well path in the formations) is lost. For example, while FIG. 2 shows the well is between the bed boundaries at certain distances, it does not show where the well is located in 3D space.

Figure 3:
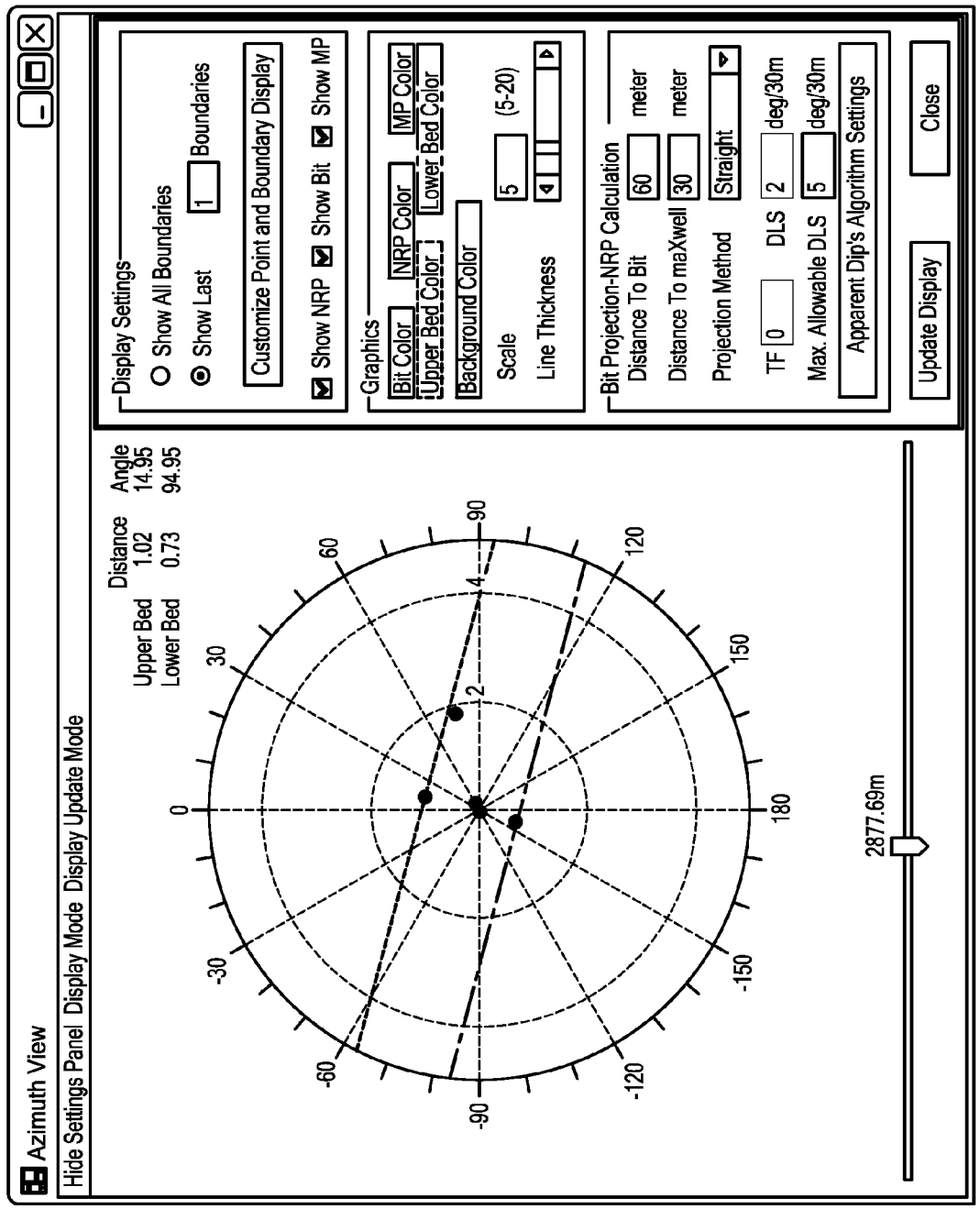
FIG. 3 shows a prior art azimuth view.

FIG. 3 shows a conventional 2D display of an azimuth view. In this display, the azimuth view is on a plane perpendicular to the bedding planes, the location of the measurement tool (i.e., measurement point, mp) is at the center of the graph, and the locations of formation parameter boundaries (e.g., formation resistivity boundaries) are displayed at their respective distances from the tool. The formation parameter boundaries are displayed as lines that represent the intersections between the boundaries and the azimuth view plane. As shown in FIG. 3, the boundaries are shown with appropriate slants to indicate their dip angles. Thus, the lateral components of the dips may be derived from this graph by the angles between the bed boundaries and the horizontal line. Note that the display in FIG. 3 provides azimuthal information at a single measurement point.

While these conventional displays can provide useful information to the users, it is desirable that more intuitive displays be available, especially when quick decisions must be made based on the information—for example, in geosteering. Some embodiments of the invention provide methods to incorporate the same information displayed by these conventional methods in a more intuitive manner such that the information can be comprehended by the user instantaneously. These embodiments of the invention provide methods that facilitate the detection and visualization of axial, azimuthal, and radial changes in formation properties geometry. For example, FIGS. 4A and 4B illustrate one such approach.

Figure 4A:
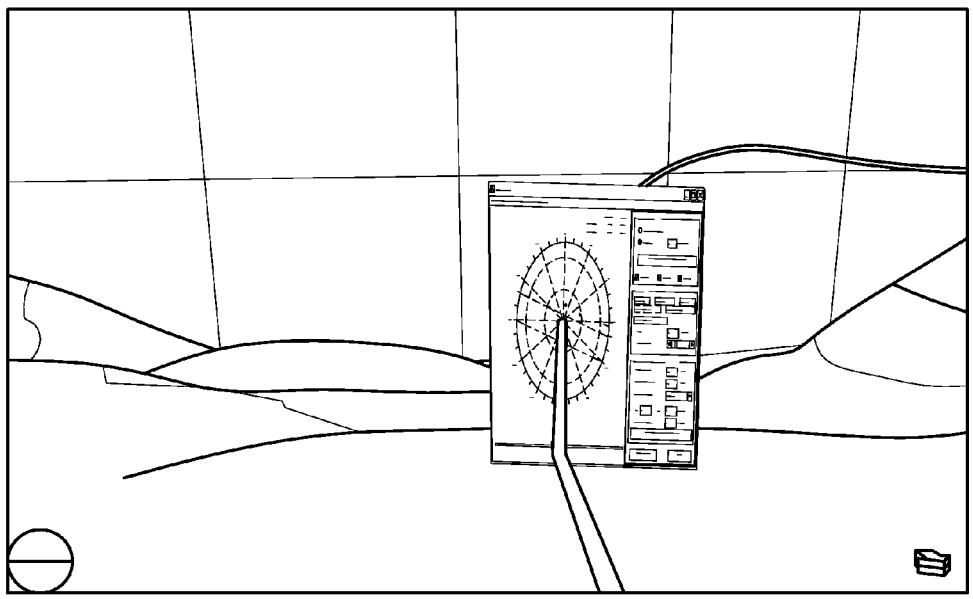
FIGS. 4A and 4B show 3D displays in accordance with one embodiment of the invention.

FIG. 4A shows that the prior art 2D azimuth view shown in FIG. 3 may be superimposed on a 3D wellbore trajectory view at the corresponding measurement point. In this superimposition, the azimuth view is placed in an appropriate orientation in the coordinate system of the 3D trajectory. Once this is done, there is no longer a need for the polar coordinate system that is conventionally displayed on the azimuth view. Therefore, one can keep only the boundary information to produce a display shown in FIG. 4B.

Figure 4B:
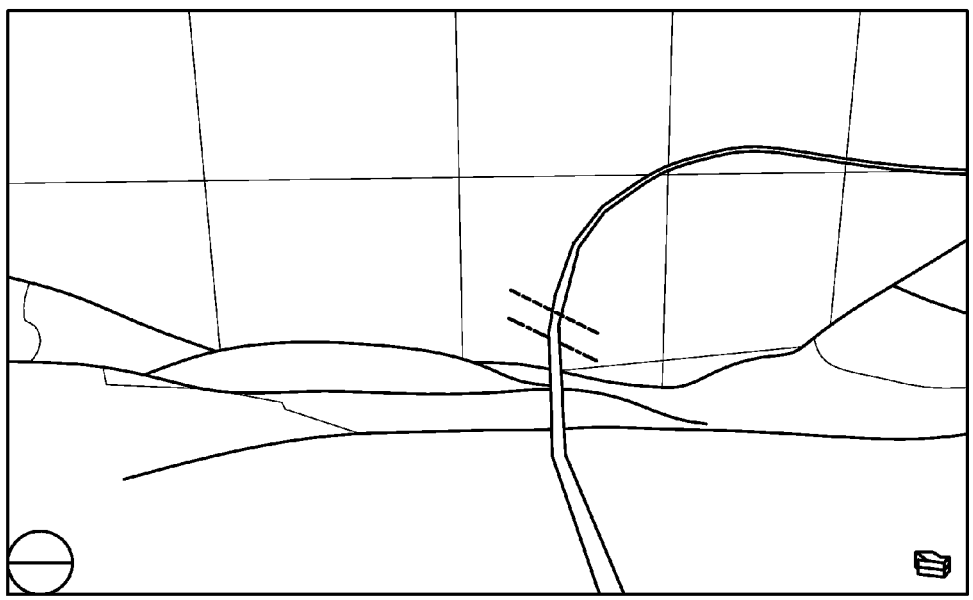

In FIG. 4B, the geometry (orientations) and the distances between the boundaries (shown as sticks) and the wellbore trajectory are displayed according to their actual orientations and distances to the measurement tool (or wellbore). Therefore, the angles between the horizontal line and the sticks (the boundaries) reflect the lateral components of the dips of the formation boundaries, relative to the earth North. It is clear that the combination of the 2D azimuth view with the 3D wellbore trajectory (as shown in FIG. 4B) makes it easier to comprehend the information regarding the bed boundaries and trajectory in 3D sense.

Note that while the above illustration uses superimposition of an azimuth view onto a 3D trajectory, other methods may be used. For example, data obtained from inversion regarding the boundary distances and orientations may be used directly, without being first presented in an azimuth view.

Figure 5A:
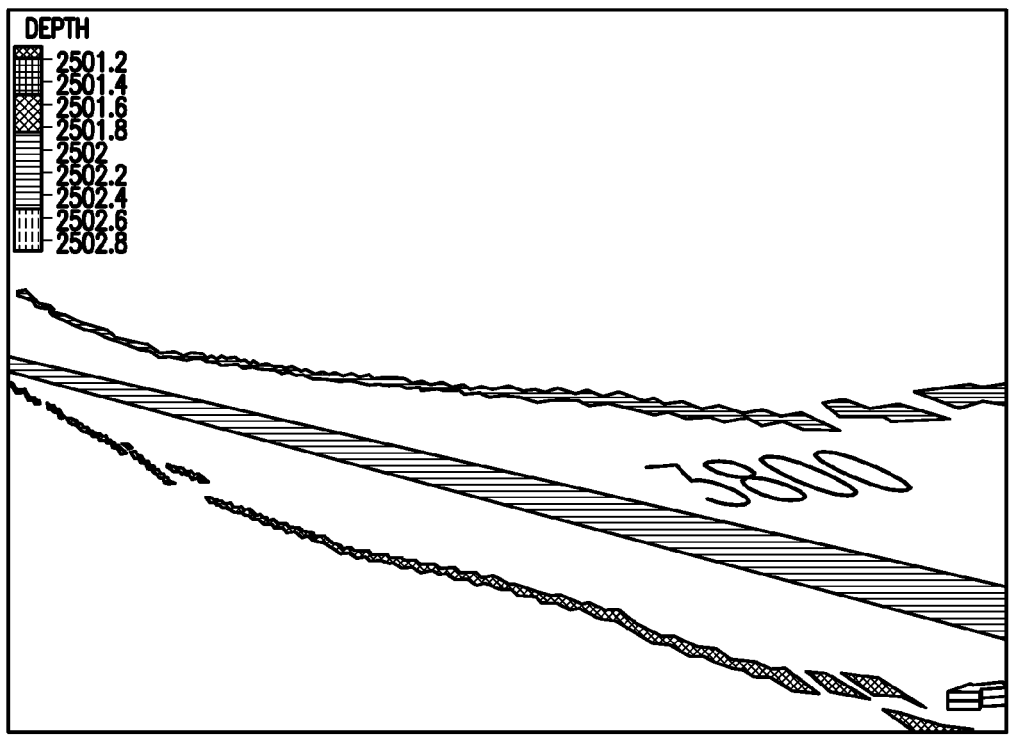
FIGS. 5A and 5B show 3D displays in accordance with another embodiment of the invention.
Figure 5B:
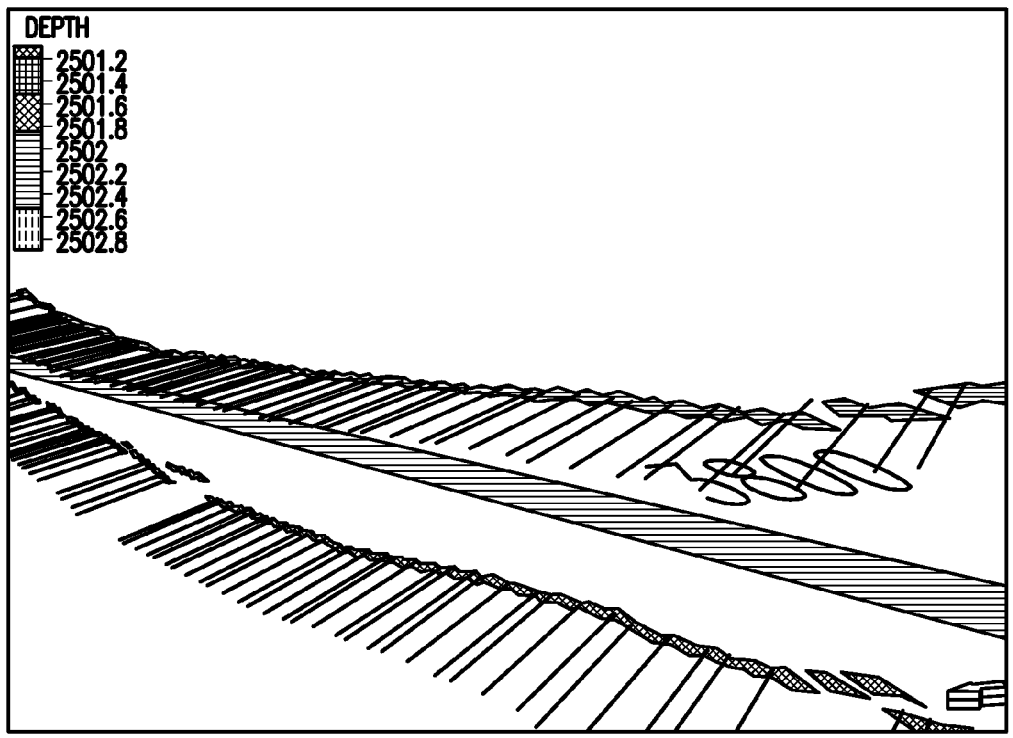

FIGS. 4A and 4B show how to present the formation boundaries onto a 3D trajectory at a single measurement point. This approach may be extended to all measurement points along the length of the wellbore, as shown in FIGS. 5A and 5B. In FIG. 5A, dots are displayed corresponding to the locations of the boundaries directly above and directly below the trajectory. While FIG. 5A provides visual information about the distances between the bed boundaries and the wellbore, it does not include information regarding dip angles of the beds. In FIG. 5B, sticks corresponding to the geometry (orientations) of the boundaries are added to the display of FIG. 5A to give a sense of dips of the formation beds (boundaries). The sticks in FIG. 5B are displayed in a way that reflects the actual data values. Therefore, the angles between the horizontal line and the sticks correspond to the lateral components of the dips of the bedding (formation parameter boundaries), oriented relative to earth North. It is clear that FIGS. 5A and 5B convey the azimuthal information in a more intuitive manner than the prior art methods.

One of ordinary skill in the art would appreciate that the displays of FIGS. 5A and 5B may be modified and enhanced in many ways. For example, various coding schemes may be used to further enhance the ease of comprehension of these displays. The coding schemes may use colors, patterns, textures, or symbols. Preferred embodiments use a color-scale (commonly called a spectrum) to represent different values. Some of these examples are shown in FIGS. 6A-6C.

Figure 6A:
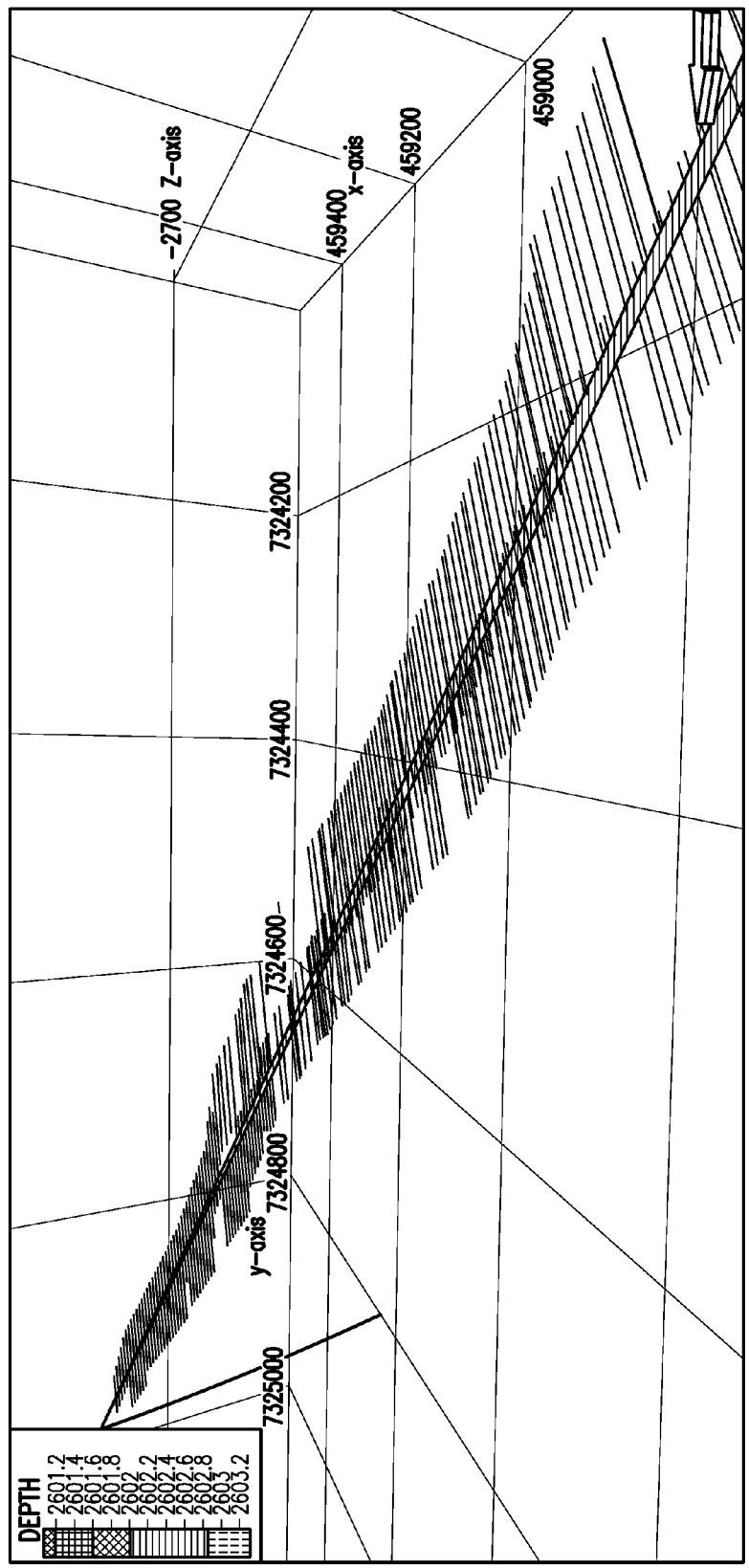
FIGS. 6A-6C show 3D displays in accordance with another embodiment of the invention.
Figure 6B:
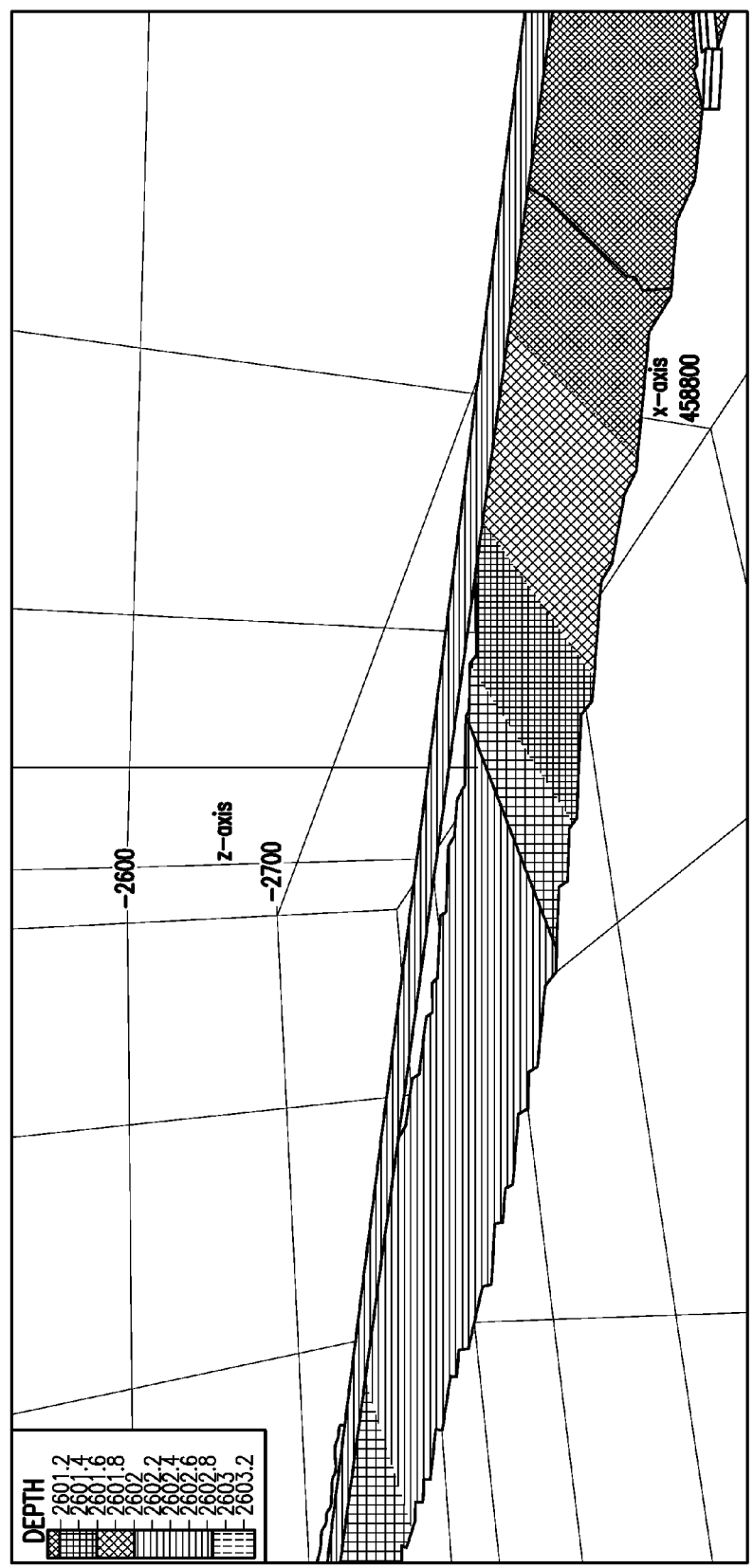
Figure 6C:
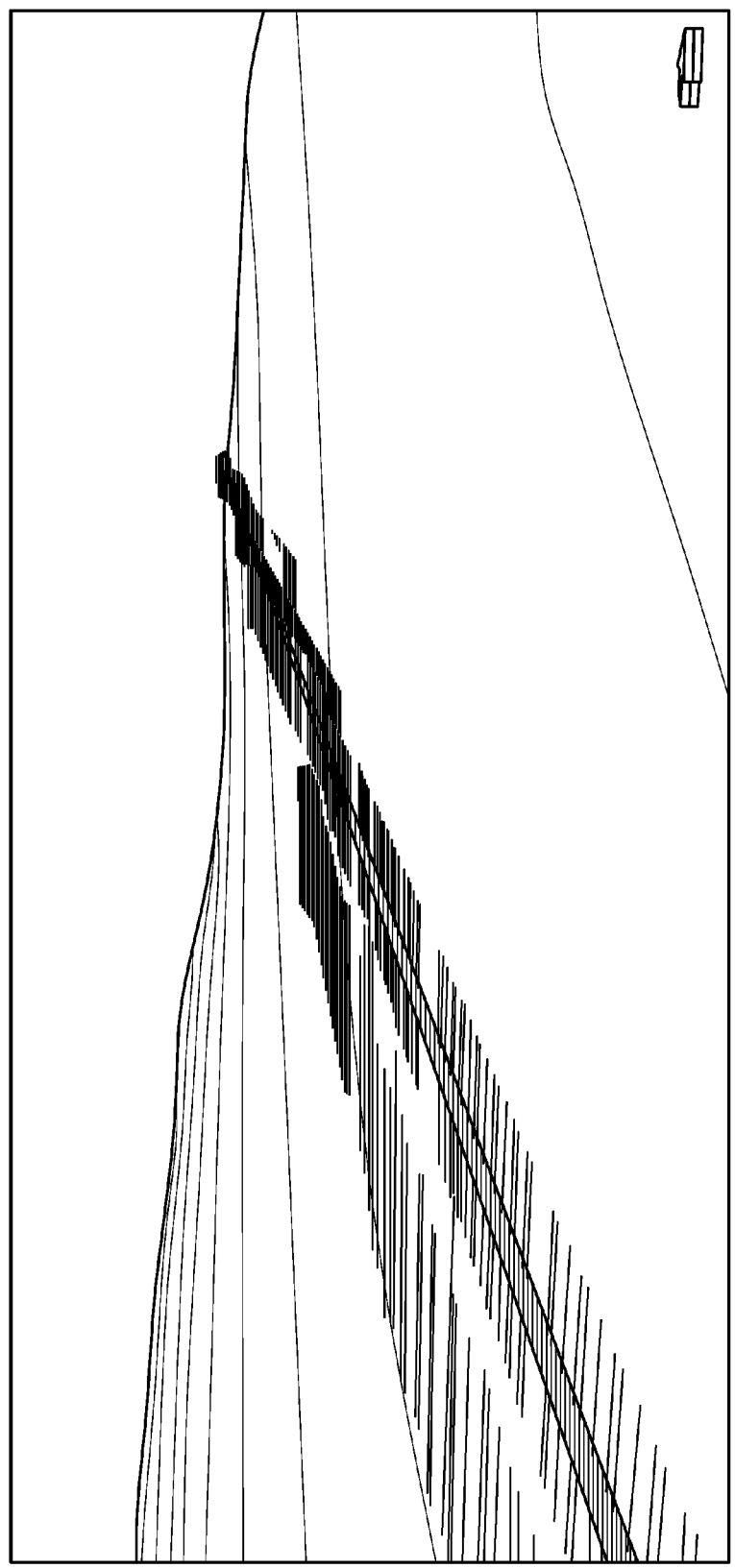

FIG. 6A shows that different colors may be used to differentiate formation boundaries above and below the trajectory. FIG. 6B shows that a continuous surface may be used to represent the series of sticks, and a color coding scheme may be used to indicate the depths at various points along this boundary surface. FIG. 6C shows that different colors may be used to represent successive layers of boundaries (or reservoirs) penetrated by the wellbore. Note that FIGS. 6A-6C are examples shown for illustration only and are not intended to limit the scope of the invention.

In addition to merging the conventional 2D information with 3D displays as described above, some embodiments of the invention relate to methods for using a combination of judiciously selected 2D displays to convey the 3D information.

Figure 7:
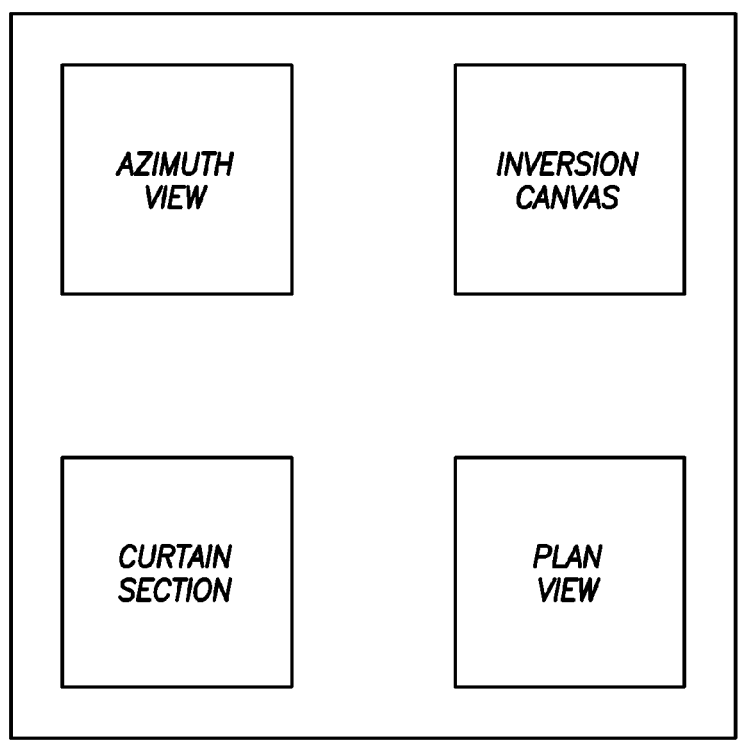
FIG. 7 shows a scheme of a combination of 2D display in accordance with one embodiment of the invention.

FIG. 7 shows one example of multiple 2D displays in accordance with one embodiment of the invention. As shown in FIG. 7, four different 2D displays, an azimuth view (as shown in FIG. 3), an inversion canvas, a curtain section view, and a plan view, are combined to give a well operator a better idea of where the drill bit is in the 3D space. Again, one of ordinary skill in the art would appreciate that this is but one example, and other modifications and variations are possible without departing from the scope of the invention. For example, in one embodiment of the invention, azimuth view, curtain section view, and plan view may be used without the inversion canvas being actually displayed.

Figure 8:
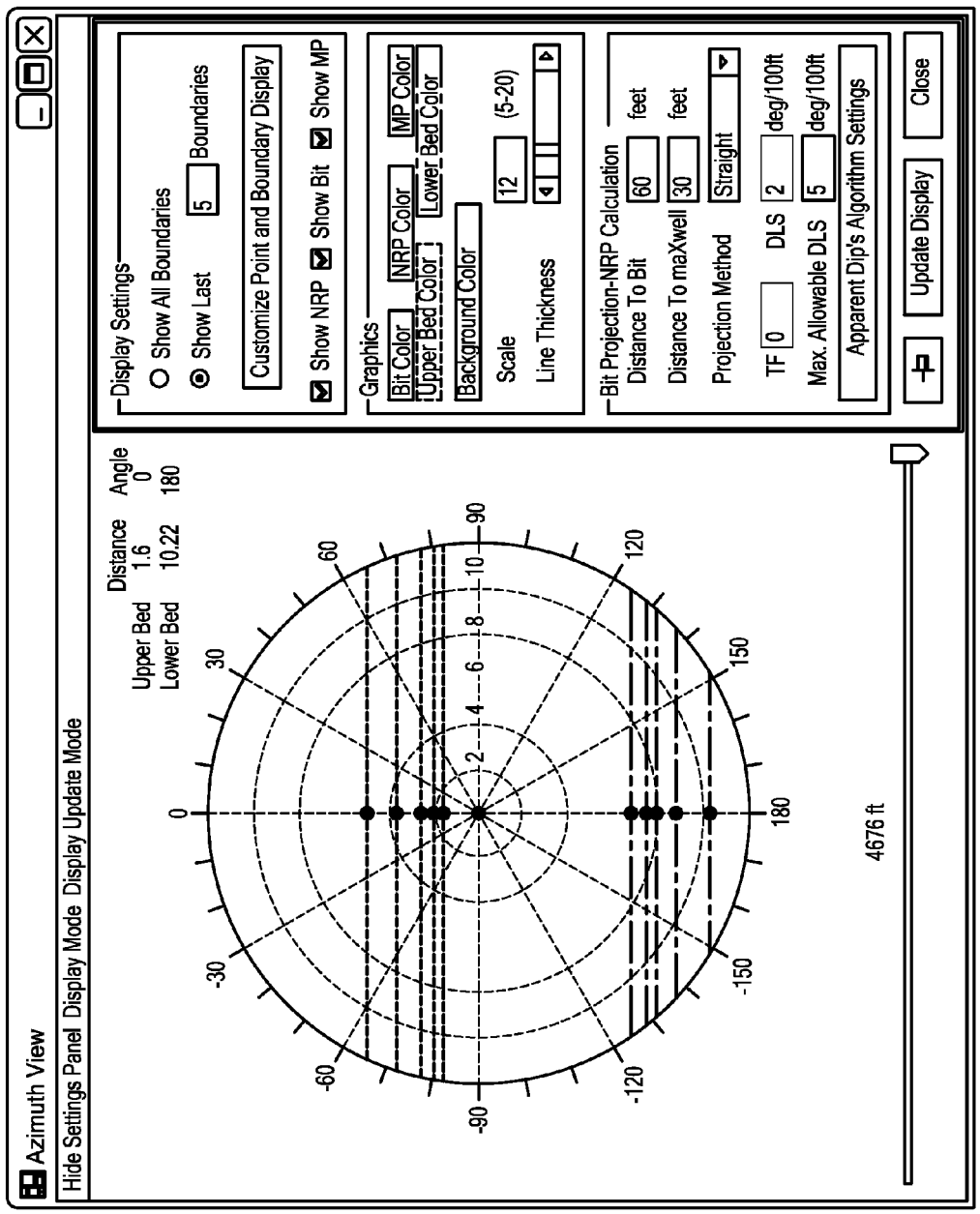
FIG. 8 shows an azimuth view in accordance with one embodiment of the invention.

FIG. 8 shows an azimuth view, similar to that shown in FIG. 3. Azimuth view is a 2D plane centered at current measured point and normal to bed boundary planes. Therefore, a bed boundary plane will be displayed as a line in the azimuth view. In this example, the upper and lower bed boundaries of the formations were determined from the measurement data and displayed at the corresponding distances from the measurement point in this graph. As shown in FIG. 8, the upper and lower bed boundaries are both horizontal. Thus, in this example, the apparent azimuth between the tool and the bed boundaries is zero, i.e., the dips of the beds are zero.

As noted above, the azimuth view is displayed on a plane perpendicular to the bed boundaries. Thus, the points in the formation surveys need to be projected onto this plane. FIGS. 9A-9C show coordinate systems to illustrate the transformation of points for projection onto an azimuth view. FIG. 9A shows a 3D survey (earth) coordinate system, in which the three axes are represented as X1 (north), Y1 (east), and Z1 (true vertical direction, TVD). The original point (x, y, z) of well deviation survey may be translated in this earth coordinate system relative to the measurement point (mp) according to the following equation: $(x_1, y_1, z_1) = (x-x_{mp}, y-y_{mp}, z-z_{mp})$, where $x_{mp}$, $y_{mp}$, and $z_{mp}$ are coordinates of the mp location.

Then, $(x_1, y_1, z_1)$ may be transformed into the tool coordinate system, $(x_2, y_2, z_2)$, where $z_2$ points in the tool direction, and $x_2$ and $y_2$ represent (or lie in) the tool plane, as shown in FIG. 9B. The transformation may be performed according to the equation: $(x_2, y_2, z_2) = A (x_1, y_1, z_1)$, where matrix $A = BC$, and $$C = \begin{pmatrix} \cos(\varphi) & \sin(\varphi) & 0 \\ -\sin(\varphi) & \cos(\varphi) & 0 \\ 0 & 0 & 1 \end{pmatrix},$$

$$B = \begin{pmatrix} \cos(\theta) & 0 & -\sin(\theta) \\ 0 & 1 & 0 \\ \sin(\theta) & 0 & \cos(\theta) \end{pmatrix},$$

wherein θ and φ are deviation and azimuth of the measurement point (mp), respectively.

Then, the point in the tool coordinate system, $(x_2, y_2, z_2)$, is transformed into the bedding coordinate system, $(x_3, y_3, z_3)$, where $z_3$ is along the normal to the bed boundary, and $x_3$ is along the apparent azimuth direction, as shown in FIG. 9C. The transformation may be accomplished according to: $(x_3, y_3, z_3) = D (x_2, y_2, z_2)$, where matrix $D = EF$.

$$F = \begin{pmatrix} \cos(\beta) & \sin(\beta) & 0 \\ -\sin(\beta) & \cos(\beta) & 0 \\ 0 & 0 & 1 \end{pmatrix},$$

-continued $$E = \begin{pmatrix} \sin(\alpha) & 0 & -\cos(\alpha) \\ 0 & 1 & 0 \\ \cos(\alpha) & 0 & \sin(\alpha) \end{pmatrix},$$

wherein $\alpha$ and $\beta$ are apparent dip and apparent azimuth, respectively, of the bed boundary relative to the tool.

Finally, the location in the bedding coordinate system, $(x_3, y_3, z_3)$, may be projected onto the azimuth view plane, $(x_4, y_4, z_4)$, by rotating $-\beta$ along the $z_3$ axis: $(x_4, y_4, z_4) = F^{-1} (x_3, y_3, z_3)$.

The azimuth view display, as shown in FIG. 8, may also display multiple bed boundaries corresponding to different measurement points. In this case, different azimuth views may be displayed in different colors and/or different transparency. For example, the view near the user may be displayed with more opaque color, and that away from the user may be displayed in a more transparent color (or vice versa) such that the information is more readily comprehensible.

In accordance with some embodiments of the invention, other information may be displayed together with the azimuth view. For example, in accordance with one embodiment of the invention, on the Azimuth View display (FIG. 8), four items are displayed. These are measured point, which is always displayed at the center, Bit and no-return-point (NRP) projections on Azimuth View plane, and Bed boundaries. Furthermore, on the right side there are three groups of parameters, which are used to customize the display and calculate bit projection and NRP.

Figure 10:
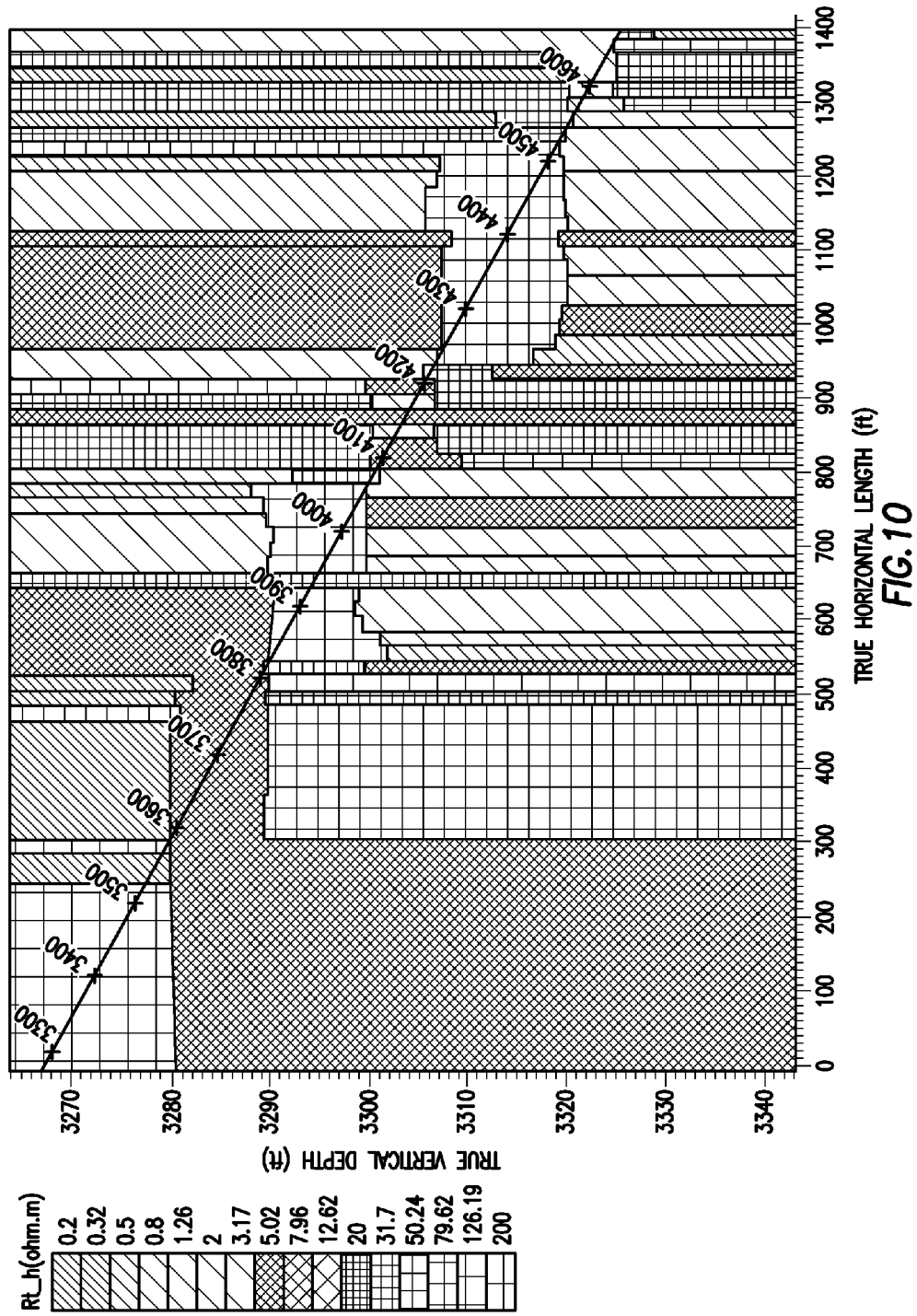
FIG. 10 shows an inversion canvas in accordance with one embodiment of the invention.

FIG. 10 shows an example of an Inversion Canvas. In a typical logging operation, raw measurement data are analyzed by inversion processing to provide data values related to the formation properties. Inversion is well known in the art and any inversion method may be used in accordance with embodiments of the invention. A typical inversion may use a 3-layer model, which will have two bed boundaries—an upper boundary and a lower boundary. After inversion, the distances from the tool to the upper and lower bed boundaries may be displayed graphically on a master canvas, as shown in FIG. 10. In the inversion canvas shown in FIG. 10, the vertical axis is the true vertical depth and the horizontal axis is the true horizontal length.

Figure 11:
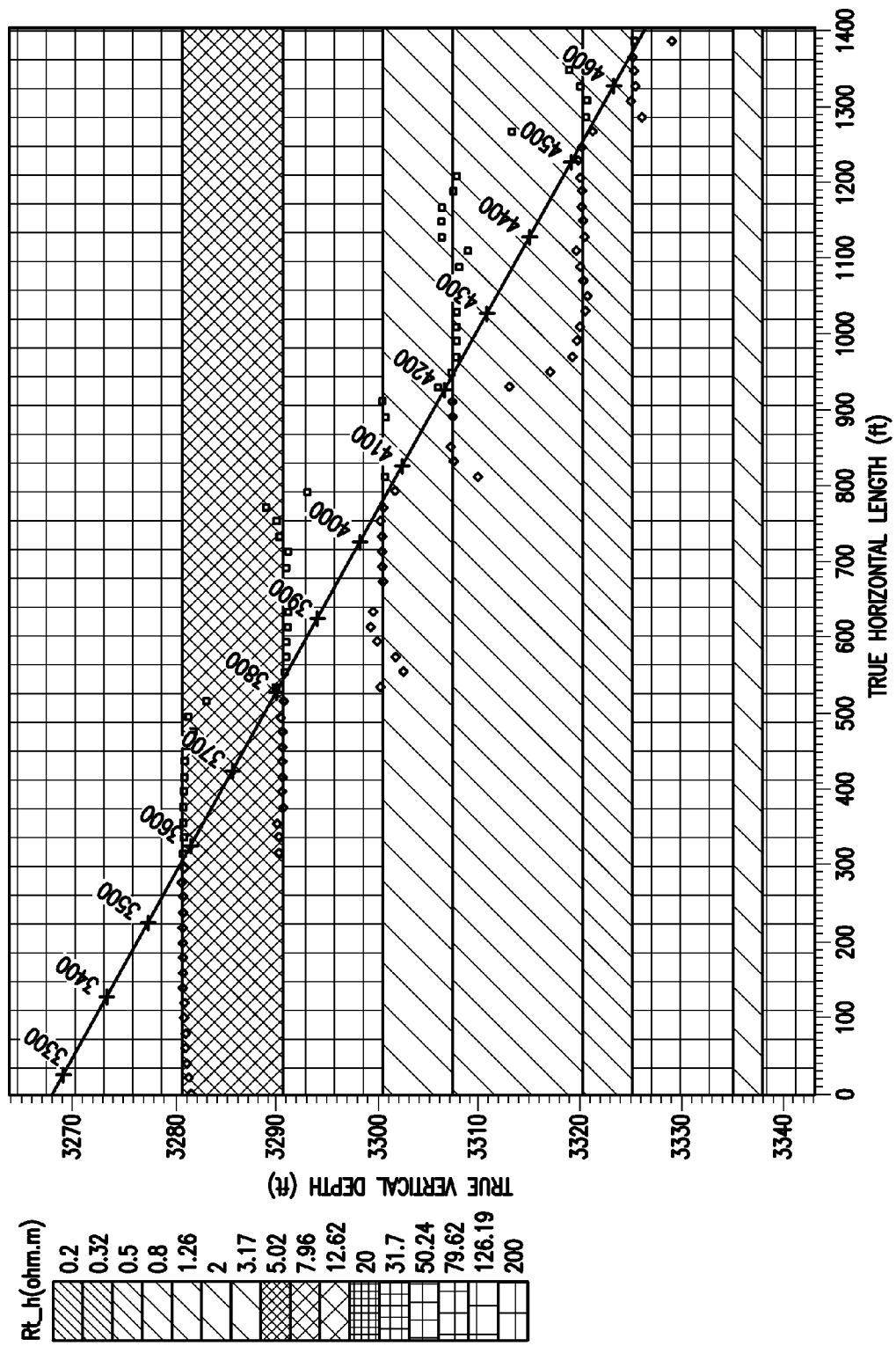
FIG. 11 shows a curtain section view in accordance with one embodiment of the invention.

FIG. 11 shows a curtain section view, which is also displayed in true vertical depth versus true horizontal length. A curtain section view represents a view on a vertical curtain running along the well trajectory. Structural and property models of the formation, as well as the forward planning results, may be displayed in the curtain section view. Color (or other) coding schemes may be used to represent different formation layers in a more comprehensible manner. For example, when displaying resistivity data, different colors may be used to reflect different resistivity values.

As shown in FIG. 11, the inverted bed boundary distances from the tool (trajectory) are also shown in the curtain section view. A comparison between FIG. 10 and FIG. 11 shows that while FIG. 10 (the inversion canvas) provides accurate locations of the upper and lower boundaries with relation to the trajectory, it does not provide any correlation with various formation layers in the formation. On the other hand, FIG. 11 (the curtain section view) provides good correlation with various formation layers. In the cases where the inverted boundaries do not coincide with the initial formation model, the computed boundary distances may be used as guidance to update the original earth model graphically.

The projection of inverted bed boundaries onto the inversion canvas and the curtain section is essentially the same—finding the distances to the boundaries in the true vertical depth direction. This may be accomplished with various methods known in the art. The following describes one method for such calculations.

The plane of an inverted bed boundary may be represented as the following equation in the tool coordinate system $(x_2, y_2, z_2)$:

$$Gx_2 + Hy_2 + Iz_2 + J = 0$$

where $G = \cos(\beta) \cdot \cos(\alpha - 90)$, $H = \sin(\beta) \cdot \cos(\alpha - 90)$, $I = \sin(\alpha - 90)$, and $J = -(\text{distance to boundary})$.

Three intersecting points between the bed boundary plane and the axes, $x_2$, $y_2$ and $z_2$, may be represented as:

$$P_1(-J/G, 0, 0), P_2(0, -J/H, 0), P_3(0, 0, -J/I)$$

The above three intersecting points can be represented in the survey coordinate system $(x_1, y_1, z_1)$ as:

$$P_1' = A^{-1} P_1, P_2' = A^{-1} P_2, P_3' = A^{-1} P_3$$

These three points $P_1'$, $P_2'$ and $P_3'$ can then be used to construct the plane of the bed boundary in the survey coordinate system $(x_1, y_1, z_1)$ as follows:

$$\begin{Vmatrix} x_1 & y_1 & z_1 & 1 \\ x_{p1'} & y_{p1'} & z_{p1'} & 1 \\ x_{p2'} & y_{p2'} & z_{p2'} & 1 \\ x_{p3'} & y_{p3'} & z_{p3'} & 1 \end{Vmatrix} = 0$$

The intersection of the above plane with $z_1$ axis gives the distance to boundary in TVD direction (D_TVD):

$$\begin{Vmatrix} 0 & 0 & D\_TVD & 1 \\ x_{p1'} & y_{p1'} & z_{p1'} & 1 \\ x_{p2'} & y_{p2'} & z_{p2'} & 1 \\ x_{p3'} & y_{p3'} & z_{p3'} & 1 \end{Vmatrix} = 0$$

The TVD values are used to display the locations of the boundaries in the inversion canvas and the curtain section views, as shown in FIGS. 10 and 11. In addition, the intersections between the plane and the $x_1$, $y_1$ axes give the distances to the bed boundary in the NS and EW directions, (D_NS, D_EW). These two intersections may be used for inversion projection onto the plan view, which will be described later with reference to FIG. 13.

$$\begin{Vmatrix} D-NS & 0 & 0 & 1 \\ x_{p1'} & y_{p1'} & z_{p1'} & 1 \\ x_{p2'} & y_{p2'} & z_{p2'} & 1 \\ x_{p3'} & y_{p3'} & z_{p3'} & 1 \end{Vmatrix} = 0,$$

$$\begin{Vmatrix} 0 & D\_EW & 0 & 1 \\ x_{p1'} & y_{p1'} & z_{p1'} & 1 \\ x_{p2'} & y_{p2'} & z_{p2'} & 1 \\ x_{p3'} & y_{p3'} & z_{p3'} & 1 \end{Vmatrix} = 0$$

Figure 12:
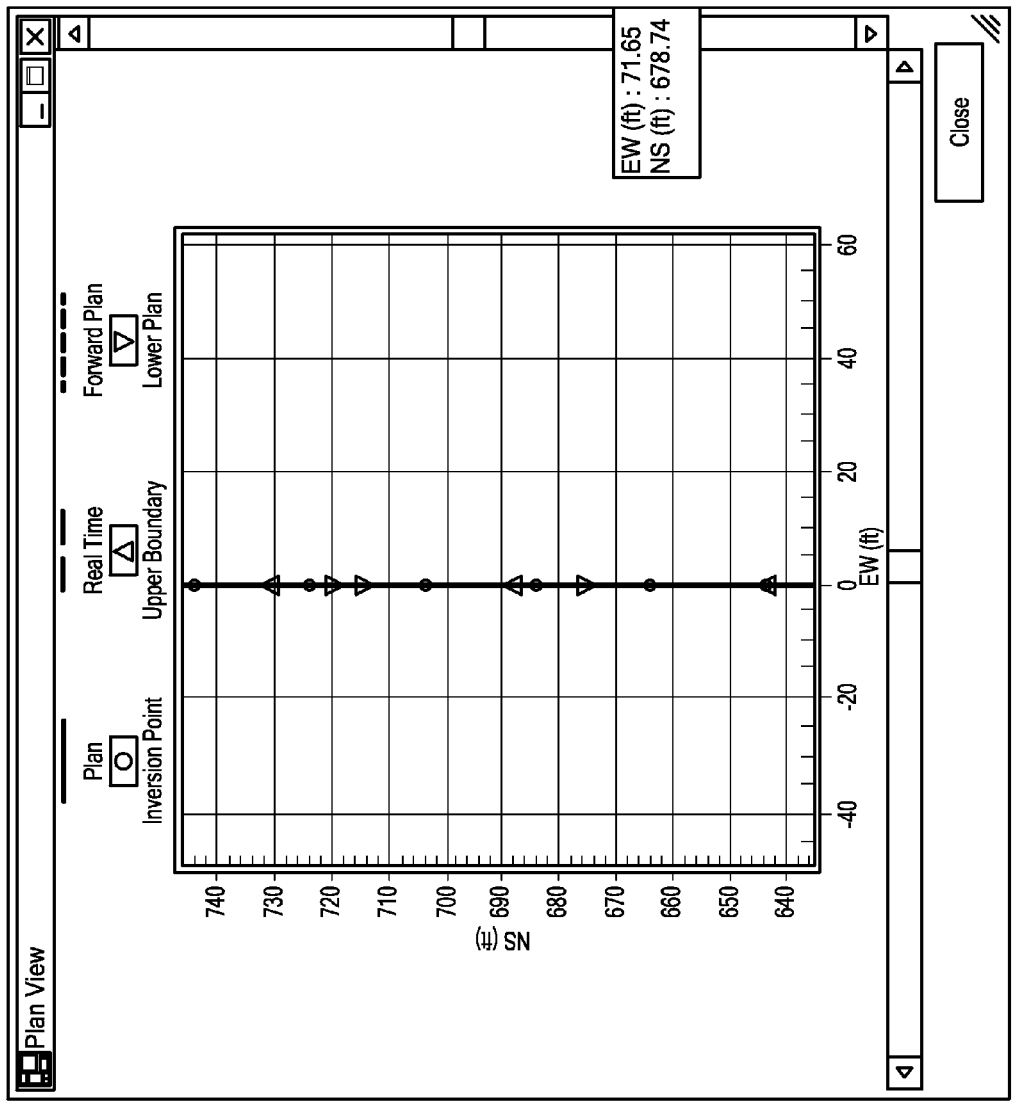
FIG. 12 shows a plan view in accordance with one embodiment of the invention.

FIG. 12 shows a plan view according to one embodiment of the invention. "Plan view" presents a view of the bed boundaries from the top, i.e., projecting bed boundaries on a horizontal plane (a plane perpendicular to the direction of the gravity). The two axes in a plan view are one for the north-south direction (NS) and the other for the east-west direction (EW). In a plan view, the upper and lower bed boundary positions may be represented with different symbols or colors such that they can be easily discerned in the graph.

FIG. 13 shows a schematic of how to project a 3D bed boundary onto a plan view. As shown in FIG. 13, the plan view coordinate system comprises the measurement point (MP) at the origin and NS ($X_1$) and EW ($Y_1$) axes, which represent the north-south direction and east-west direction, respectively. A bed boundary (BB) interests the NS and EW axes at $I_1$ and $I_2$, respectively. In this coordinate system, $I_1$ is located at (D_NS, 0) and $I_2$ is located at (0, D_EW). A normal to the bed boundary (BB) that passes through MP intersects the bed boundary (BB) at an intersecting point $I_0$.

The distance from the intersecting point $I_0$ to MP is (d $\cos(\gamma)$, d $\sin(\gamma)$), where $d = D\_NS \cdot D\_EW / \sqrt{D\_NS^2 + D\_EW^2}$ and $\tan(\gamma) = D\_NS/D\_EW$. Take into account the NS and EW values of MP, the coordinate of the projection point in the plan view will be (d $\cos(\gamma)$+xmp, d $\sin(\gamma)$+ymp).

The above description clearly shows that various 2D displays convey different information. For example, an azimuth view can provide information regarding the dips of formation boundaries. A curtain section view and an inversion canvas can easily show the location of the drill bit (or sensor) with respect to its true vertical depth and true horizontal length. A plan view shows how a wellbore runs in the horizontal directions. Thus, a judicious combination of these displays can inform a user about the location of the sensor (hence the drill bit) in the 3D space, the azimuthal orientation of the sensor, the distances to the nearby formation bedding boundaries, the trend of the well path, etc.

In accordance with some embodiments of the invention, the multiple display views (e.g., the four displays shown in FIG. 7) may be synchronized with each other to show the inverted result along the measured depth. Any synchronization method known in the art may be used. During a real time job, it is easy for a user to tell from these four 2D views about the trend of the well path—whether the tool gets closer to a bed boundary, gets further away from a bed boundary, or stays more or less the same distance to the bed boundary. If the tool is approaching a boundary from sand to shale, for example, as revealed by any of these 2D views, prompt action should be taken to change the well path to avoid penetrating into the shale.

Figure 14:
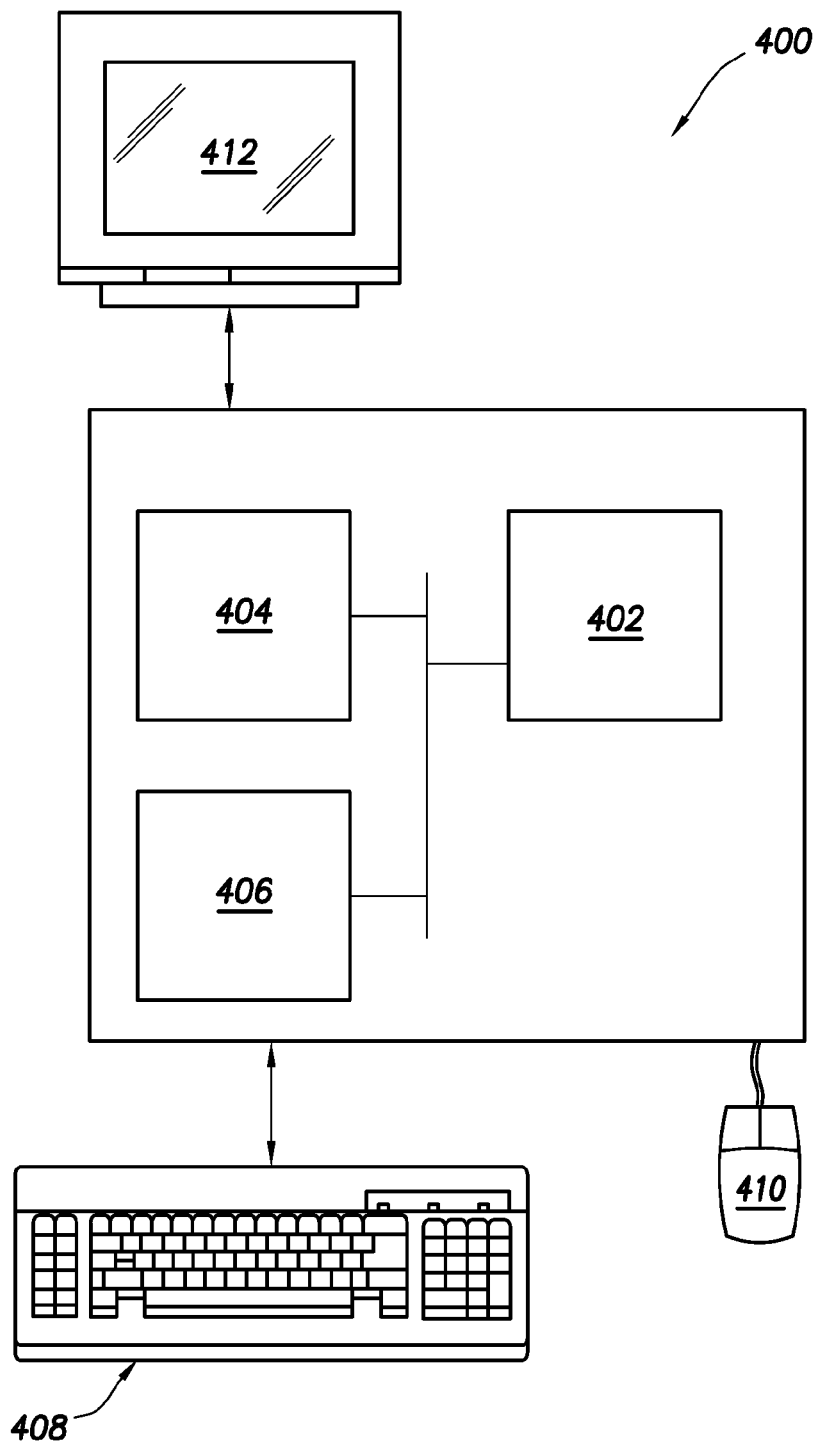
FIG. 14 shows a conventional computer system that can be used with embodiments of the invention.

An embodiment of the invention may be implemented on virtually any type of computer regardless of the platform used. For example, as shown in FIG. 14, a computer system 400 includes a processor 402, associated memory 404, a storage device 406, and numerous other elements and functionalities typical of today's computers (not shown). The computer 400 may also include input means, such as a keyboard 408 and a mouse 410, and output means, such as a monitor 412. The computer system 400 may be connected to a local area network (LAN), a wide area network, (WAN) or internet via a network interface connection (not shown). Those skilled in the art will appreciate that these input and output means may take other forms. Further, those skilled in the art will appreciate that one or more elements of the aforementioned computer 400 may be located at a remote location and connected to the other elements over a network. Further, software instructions to perform embodiments of the invention may be stored on a computer readable medium such as a compact disc (CD), a diskette, a tape, a file, or any other computer readable storage device.

While the above description uses resistivity measurements to illustrate embodiments of the invention, one of ordinary skill in the art would appreciate that the invention is not so limited. Other parameters that can provide benefit to the well operator include, but are not limited to: borehole annular pressure, weight-on-bit, torque, formation density, gamma ray, caliper (hole size and hole shape), formation sonic velocity, formation pressure, thermal neutron porosity, epithermal neutron porosity, and magnetic resonance bound fluid volume, free fluid volume, porosity, and T2 spectrum. Parameters are not limited to individual, direct measurements. Parameters may also be the result of computations made with one or more sensor measurements, such as fluid (water, oil, and gas) saturation, formation pressure, fracture pressure, and permeability. Some parameters vary azimuthally around the circumference of the wellbore, and certain logging sensors can discreetly measure these azimuthally varying parameters. Therefore, this invention will also provide for the detection and visualization of axial and azimuthal changes in formation parameters.

Embodiments of the invention can use various types of logging data obtained with various types of tools, which include, but are not limited to: surface sensors (such as weight-on-bit, torque, flowrate-in, flowrate-out, standpipe pressure, temperature relative to bit depth), downhole LWD sensors (such as gamma ray, resistivity, density, porosity, sonic velocity, caliper for hole size and shape), measurement-while-drilling (MWD) sensors (such as borehole annular pressure, downhole weight-on-bit and torque, inclination, azimuth), wireline and drill pipe-conveyed wireline tools, drill pipe-conveyed sensors, coiled-tubing conveyed sensors, casing-conveyed sensors, tractor-conveyed sensors, permanent downhole sensors, and any combination of these sensors in open hole and/or cased hole.

Advantageously, embodiments of the present invention provide methods for displaying formation measurement data in 3D intuitive manner such that a user can quickly comprehend the information contents, e.g., the bit location, the direction of the progressing well, etc. This will enable the operator to take proper action, if the wellbore deviates from the planned path. Some embodiments of the invention incorporate the conventional 2D information into 3D displays. Other embodiments of the invention uses multiple 2D displays to convey 3D information.

While the invention has been described with respect to a limited number of embodiments, those skilled in the art, having benefit of this disclosure, will appreciate that other embodiments can be devised which do not depart from the scope of the invention as disclosed herein. For example, though bed boundaries were used in the above description as the geological structure of interest, a fault may be the structure of interest and play the role of a boundary. Also, the terms bed boundaries, bedding planes, and formation parameter boundaries are used interchangeably in the description above. Accordingly, the scope of the invention should be limited only by the attached claims.

What is claimed is:

1. A method for displaying a formation model while drilling a wellbore in the formation, comprising:
   operating a well logging instrument at a measurement point in the formation along a wellbore while the wellbore is being drilled;
   obtaining measurement data regarding the formation from the well logging instrument;
   determining from the measurement data an actual orientation of a geological structure;

displaying a trajectory of the wellbore in three dimensions as it is being drilled through the formation;

displaying, while drilling the wellbore, the geological structure along the trajectory of the wellbore according to the determined actual orientation of the geological structure, wherein the orientation reflects an azimuth angle of planes corresponding to the geological structure; and changing the trajectory of the wellbore in response to displaying the determined actual orientation of the geological structure relative to the trajectory.

2. The method of claim 1, wherein the geological structure is displayed as a set of sticks.

3. The method of claim 1, wherein the geological structure is displayed as one or more surfaces.

4. The method of claim 3, wherein the one or more surfaces have a coding scheme according to one or more measurement parameters.

5. The method of claim 4, wherein the coding scheme is at least one of the following: a color, a color scale, a pattern, a texture, or a symbol.

6. The method of claim 1, wherein the measurement data includes one or more of directional electromagnetic measurements, resistivity, borehole annular pressure, weight-on-bit, torque, formation density, gamma ray, caliper, formation sonic velocity, formation pressure, thermal neutron porosity, epithermal neutron porosity, and magnetic resonance bound fluid volume, free fluid volume, porosity, and T2 spectrum.

7. The method of claim 1, wherein the geological structure is a bed boundary.

8. The method of claim 1, wherein the geological structure is a fault.

9. The method of claim 1, wherein the geological structure is displayed as one or more formation layers.

10. The method of claim 9, wherein the one or more formation layers have a coding scheme according to one or more measurement parameters.

11. The method of claim 10, wherein the coding scheme is at least one of the following: a color, a color scale, a pattern, a texture, or a symbol.

12. The method of claim 11 wherein a plurality of formations layers is displayed with a color corresponding to a resistivity of each layer.

13. A method of displaying a 3D image of a geological structure relative to a wellbore comprising the steps of:

disposing a logging instrument at a measurement point in the wellbore penetrating a while drilling the wellbore in the formation;

operating the logging instrument and obtaining measurement data regarding the formation;

determining from the measurement data an actual orientation of a geological structure;

displaying the geological structure while drilling the wellbore using at least one of the following,
 (a) in an azimuth view corresponding to the measurement point, wherein the azimuth view is a projection on a plane perpendicular to the wellbore,
 (b) in a curtain section view, wherein the curtain section view corresponds to a vertical cross section running along the wellbore, and wherein the curtain section view includes a formation model comprising the wellbore,
 (c) in a plan view, wherein the plan view is a projection onto a horizontal plane;

displaying the geological structure on an inversion canvas, wherein the inversion canvas displays the wellbore on a graph having true vertical depth and true horizontal length as the two axes; and changing the trajectory of the wellbore in response to displaying the geological structure and the wellbore trajectory.

14. The method of claim 13, wherein the geological structure is displayed as a set of sticks.

15. The method of claim 13, wherein the geological structure is displayed as one or more surfaces.

16. The method of claim 15, wherein the one or more surfaces have a coding scheme according to one or more measurement parameters.

17. The method of claim 16, wherein the coding scheme is at least one of the following: a color, a color scale, a pattern, a texture, or a symbol.

18. The method of claim 13, wherein the measurement data includes one or more of directional electromagnetic measurements, resistivity, borehole annular pressure, weight-on-bit, torque, formation density, gamma ray, caliper, formation sonic velocity, formation pressure, thermal neutron porosity, epithermal neutron porosity, and magnetic resonance bound fluid volume, free fluid volume, porosity, and T2 spectrum.

19. The method of claim 13, wherein the geological structure is a bed boundary.

20. The method of claim 13, wherein the geological structure is a fault.

21. The method of claim 13, wherein the geological structure is displayed as one or more formation layers.

22. The method of claim 20, wherein the one or more formation layers have a coding scheme according to one or more measurement parameters.

23. The method of claim 21, wherein the coding scheme is at least one of the following: a color, a color scale, a pattern, a texture, or a symbol.

24. The method of claim 23 wherein a plurality of formation layers is displayed with a color corresponding to a resistivity of each layer.

* * * * *